United States Patent
Takikita

(10) Patent No.: US 7,366,467 B2
(45) Date of Patent: Apr. 29, 2008

(54) BASE STATION AND MOBILE STATION IN DEDICATED SHORT RANGE COMMUNICATIONS SYSTEM

(75) Inventor: Mamoru Takikita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 457 days.

(21) Appl. No.: 10/795,303

(22) Filed: Mar. 9, 2004

(65) Prior Publication Data

US 2005/0020211 A1    Jan. 27, 2005

(30) Foreign Application Priority Data

Jul. 23, 2003    (JP)    ............... 2003-278565

(51) Int. Cl.
*H04B 7/00*    (2006.01)
(52) U.S. Cl. ............... 455/41.2; 455/500; 455/552.1; 370/337; 370/347
(58) Field of Classification Search ............... 455/41.2, 455/500, 552.1; 370/337, 347
See application file for complete search history.

(56) References Cited

U.S. PATENT DOCUMENTS

| | | | | |
|---|---|---|---|---|
| 4,547,778 A | * | 10/1985 | Hinkle et al. ............... | 343/456 |
| 6,587,443 B1 | * | 7/2003 | Dutta ........................ | 370/322 |
| 6,597,278 B1 | * | 7/2003 | Ando ........................ | 340/5.25 |
| 6,600,422 B2 | * | 7/2003 | Barry et al. .............. | 340/573.3 |
| 6,829,531 B2 | * | 12/2004 | Lee ............................. | 701/205 |
| 7,076,269 B2 | * | 7/2006 | Konishi et al. .......... | 455/552.1 |

FOREIGN PATENT DOCUMENTS

| | | | |
|---|---|---|---|
| JP | 10-84311 A | | 3/1998 |
| JP | 2000-358265 A | | 12/2000 |
| JP | 2001-109993 | * | 4/2001 |
| JP | 2001-109993 A | | 4/2001 |
| WO | 03/009253 A1 | | 1/2003 |

* cited by examiner

*Primary Examiner*—Nay Maung
*Assistant Examiner*—Tuan H. Nguyen
(74) *Attorney, Agent, or Firm*—Sughrue Mion, PLLC

(57) ABSTRACT

A dedicated short range communications system can warn mutual approach between vehicles having mobile stations installed thereon through dedicated short range communications. Each mobile station includes: a data processing unit that performs data processing of radio transmission signals received by and to be sent from its own mobile station; and an other station allocation determination unit that determines, based on a frame control information slot of the received signal, whether a message data slot of the received signal is allocated to another mobile station. Each mobile station further includes: a message data slot allocation request unit that requests, in an activation slot of the radio transmission signal to be sent, the base station to allocate a message data slot to its own mobile station; and a warning command unit that generates a warning command when a message data slot of the received signal is allocated to another mobile station.

7 Claims, 14 Drawing Sheets

BASE STATION AND MOBILE STATION IN DEDICATED SHORT RANGE COMMUNICATIONS SYSTEM

BACKGROUND OF THE INVENTION

1. Field of the Invention

The present invention relates to a dedicated short range communications (hereinafter also referred to as DSRC) system that provides a warning of the approach of another vehicle in vehicle to roadside communications, and more specifically, it relates to a mobile station and a base station used in such a dedicated short range communications system.

2. Description of the Related Art

There have hitherto been known conventional dedicated short range communications systems which are used in automatic or electronic toll collection for toll roads or the like so as to execute electronic toll collection applications through data communications. Communication frames in the form of radio or wireless transmission signals used at that time are described, for example, in "Dedicated Short Range Communications (DSRC) System Standard ARIB STD-T75" provided by Association of Radio Industries and Businesses, a public service corporation in Japan. In addition, as a result of toll collection, instruction information is sent from a base station to a mobile station through data transmission so as to notify the mobile station of the permission or non-permission of passage, communication abnormality, or the like (see, for instance, a first patent document: Japanese patent application laid-open No. 2000-307506).

Moreover, dedicated short range communications systems are also used in software applications in which a base station detects the travel speed of a vehicle having a mobile station installed thereon through data communicated between the base station and the mobile station, so that danger, if any, is notified from the base station to the mobile station based on location information on the base station (see, for instance, a second patent document: Japanese patent application laid-open No. 2001-109993).

In conventional dedicated short range communications systems, a dedicated short range communications mobile station (hereinafter referred to as a DSRC mobile station) is not provided with any means for detecting the existence of other mobile stations, and hence in software applications such as electronic toll collection system applications, parking lot applications, etc., for instance, a crossing gate might not sometimes be opened to interrupt traffic of a vehicle such as a car depending upon a variety of conditions such as communication errors, non-insertion of a card into an associated mobile station, etc. In this case, the operator of the car with a mobile station mounted thereon is forced to rapidly stop the car in order to avoid colliding with the crossing gate, but when the operator of the following car is late in noticing the stoppage of the preceding car, the following car cannot occasionally avoid collision against the preceding car.

SUMMARY OF THE INVENTION

Accordingly, an object of the present invention is to provide a mobile station and a base station in a dedicated short range communications system which is capable of providing a warning of approach between vehicles having mobile stations installed thereon through a dedicated short range communications system.

Bearing the above object in mind, the present invention resides in a mobile station of a dedicated short range communications system capable of performing dedicated short range communications between a base station and at least one mobile station by using a radio transmission signal of a communication frame configuration having message data slots to be allocated to mobile stations, respectively, a frame control information slot including allocation information of mobile stations allocated to the message data slots, respectively, and an activation slot for a mobile station to request the base station to allocate one of the message data slots to its own station. Each of the mobile stations includes: a data processing unit that performs data processing of radio transmission signals received by and to be sent from its own mobile station; and an other station allocation determination unit that determines, based on a frame control information slot of the received radio transmission signal, whether a message data slot of the received radio transmission signal is allocated to another mobile station. Each of the mobile stations further includes: a message data slot allocation request unit that requests, in an activation slot of the radio transmission signal to be sent, the base station to allocate a message data slot to its own mobile station; and a warning command unit that generates a warning command when a message data slot of the received radio transmission signal is allocated to another mobile station. With this arrangement, it is possible to provide a warning of the existence of a mobile station installed on another vehicle to operators of other vehicles around the base station to which the own vehicle is approaching, thereby preventing vehicle accidents such as rear-end collisions, etc.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described below in detail while referring to the accompanying drawings.

Embodiment 1

Figure 1:
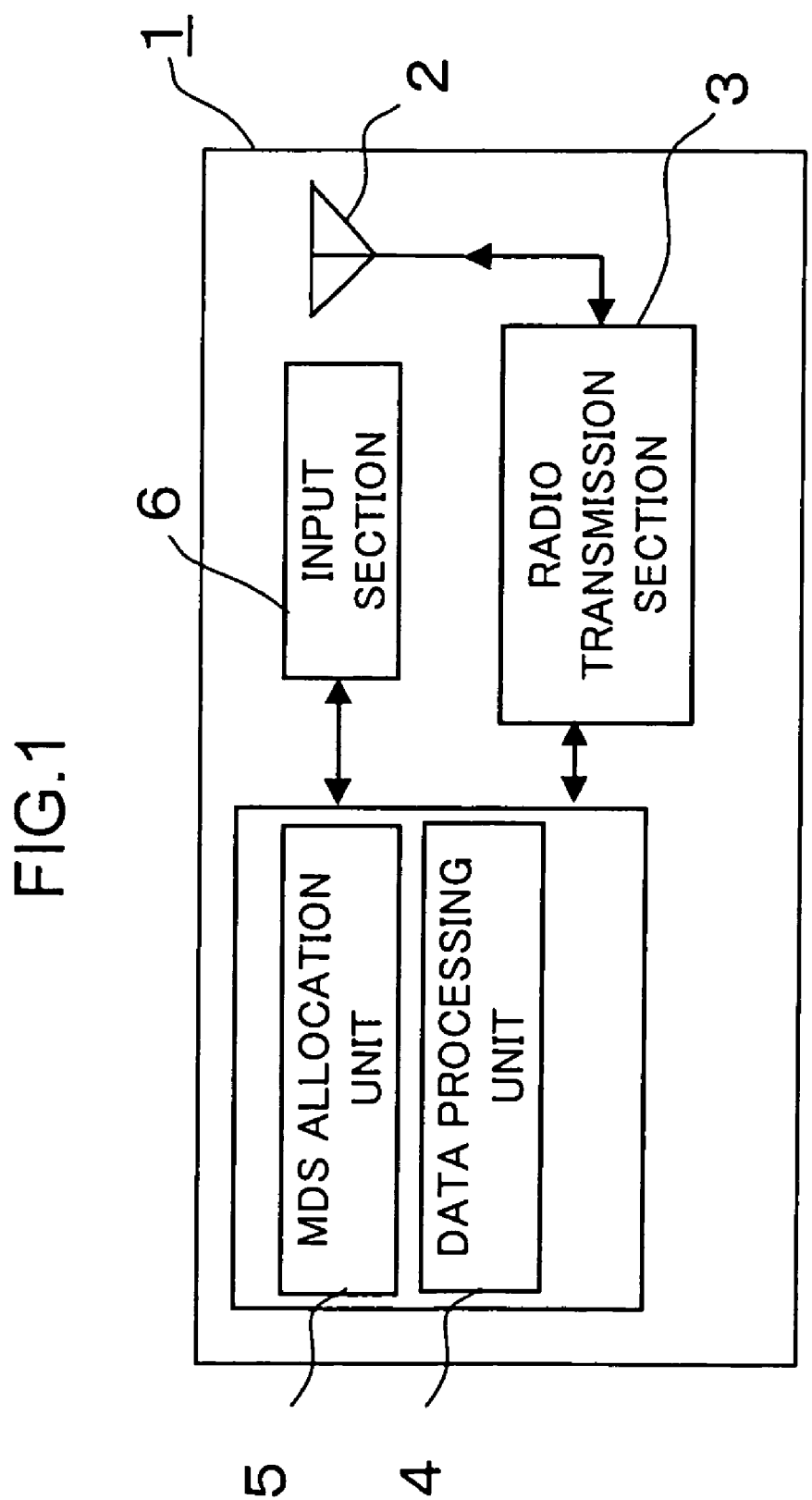
FIG. 1 is a view showing the configuration of a base station in a dedicated short range communications system according to a first embodiment of the present invention.
Figure 2:
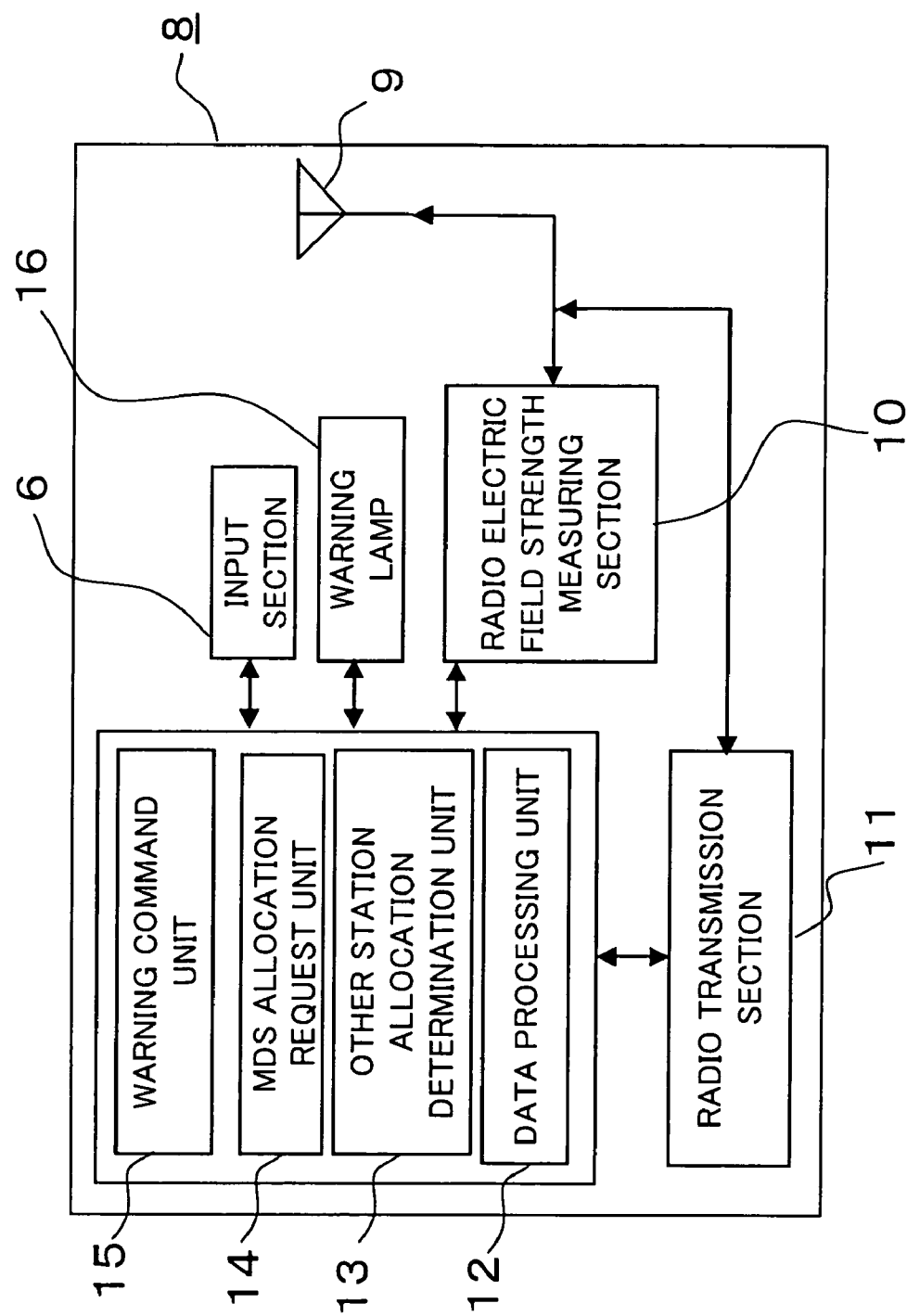
FIG. 2 is a view showing the configuration of a mobile station in the dedicated short range communications system according to the first embodiment of the present invention.

FIG. 1 is a block diagram of a base station in a dedicated short range communications system (hereinafter simply referred to as a base station) according to a first embodiment of the present invention. FIG. 2 is a block diagram of a mobile station in the dedicated short range communications system (hereinafter simply referred to as a mobile station) according to the first embodiment of the present invention.

As shown in FIG. 1, the base station, generally designated at reference numeral 1, includes a base station antenna 2, a radio communication unit 3 that communicates with the mobile station, generally designated at reference numeral 8, through a base station antenna 2, a data processing unit 4 that converts a radio or wireless transmission signal, which is sent from the mobile station 8 and received by the radio communication unit 3, into corresponding reception data, determines whether there is a message data slot allocation request from a mobile station in an activation slot, and updates message data slot allocation information on the frame control information slot when a message data slot is allocated to the mobile station which made the allocation request, a message data slot allocation unit 5 (hereinafter referred to as MDS allocation part) that allocates the message data slot to the mobile station which made the allocation request when there is a message data slot allocation request from the mobile station, and an input section 6 by which necessary information for the base station 1 can be input from outside.

The data processing unit 4 and the MDS allocation unit 5 are constituted by a microcomputer including a CPU, a RAM, a ROM, interfaces, etc.

As shown in FIG. 2, the mobile station 8 includes a radio electric field strength measuring section 10 that extracts a signal component of a designated specific frequency band from a reception signal received at a mobile station antenna 9 to measure a reception level (electric field strength), a radio communication unit 11 that communicates with the base station 1 through the movable station antenna 9, a data processing unit 12 that performs data processing of radio transmission signals sent from and received by the radio communication section 11, an other station allocation determination unit 13 that determines whether a message data slot in the frame control information slot of the reception data is allocated to another mobile station, a message data slot allocation request unit 14 (hereinafter referred to as an MDS allocation request unit) that sets an allocation request in an activation slot upon requesting an own-station message data slot to the base station 1, a warning command unit 15 that generates a warning command when a message data slot is allocated to another mobile station, a warning unit in the form of a warning lamp 16 that provides a warning to an occupant or operator of the vehicle based on the warning command, and an input section 6 by which an occupant or operator can input information necessary for operating the mobile station 8. The data processing unit 12, the other station allocation determination unit 13, the MDS allocation request unit 14 and the warning command unit 15 are constituted by a microcomputer that includes a CPU, a RAM, a ROM, interfaces, etc.

Figure 3:
FIG. 3 is a view showing the configuration of a communication frame in the dedicated short range communications system according to the first embodiment of the present invention.

A signal format of a radio transmission signal transmitted between the base station 1 and the mobile station 8 according to the present invention is shown in FIG. 3. This signal format is described in "Dedicated Short Range Communications (DSRC) System Standard ARIB STD-T75". According to this DSRC System Standard, one frame is composed of (n+2) time slots where n is a positive integer. In addition, radio transmission from the base station 1 to the mobile station 8 is called a down link, whereas radio transmission from the mobile station 8 to the base station 1 is called an up link.

In the down link, the leading or first slot of a frame is used as a frame control massage slot (hereinafter referred to as an FCMS) for transmission of informative information from the base station 1. The n slots following this FCMS are used as message data slots (hereinafter referred to as MDSes) for data communications.

Also, in the up link, the trailing or last slot used for requesting the MDS allocation processing of own station from the mobile station 8 to the base station 1 is used as an activation slot (hereinafter referred to as an ACTS).

The FCMS includes a preamble (PR), a base station ID (BID), and MDS allocation information (ID1-ID5 (mobile station IDs)).

The ACTS includes a ramp (R), a preamble (PR) and a mobile station ID (MID).

Figure 4:
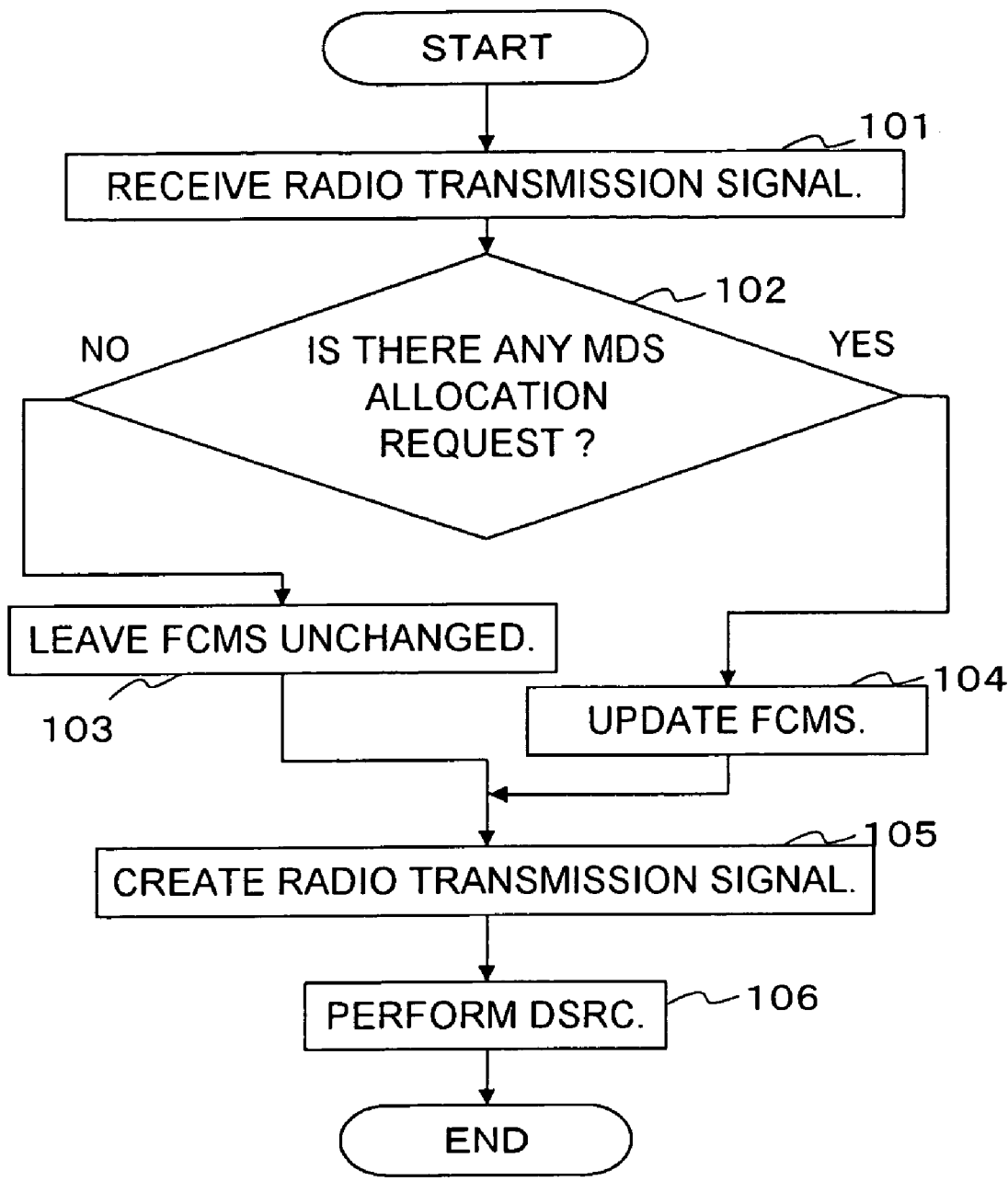
FIG. 4 is a flow chart showing the operation of the base station in the dedicated short range communications system according to the first embodiment of the present invention.

Next, reference will be made, based on flow charts shown in FIGS. 4 and 5, to a procedure for detecting the approach of a vehicle having another mobile station installed thereon to provide a warning thereof.

First of all, the operation of the base station 1 will be described while referring to FIG. 4.

In step S101, when the base station 1 is activated, the radio communication section 3 receives a radio transmission signal from the mobile station 8.

In step S102, the data processing unit 4 determines whether an MDS allocation request is included in the ACTS of the radio transmission signal thus received. When there is no MDS allocation request included, the processing flow advances to step S104, whereas when there is an MDS allocation request included, the processing flow advances to step S103.

In step S103, the FCMS is left unchanged since there is no MDS allocation request.

In step S104, the FCMS is updated by a piece of MDS allocation information comprising an allocated MDS and an ID of the mobile station 8 that made the MDS allocation request.

In step S105, a radio transmission signal is created by using a communication frame including the unchanged or updated FCMS, and is sent to the radio communication section 3.

In step S106, the radio communication section 3 performs dedicated short range communications with the mobile station 8.

Next, the operation of the mobile station 8 will be described while referring to FIG. 5.

In step S110, when the mobile station 8 is activated, the radio electric field strength measuring section 10 measures the strength of an electric field therearound.

In step S111, it is determined whether the strength of electric field thus measured is greater than a preset lower limit. When the measured electric field strength is less than or equal to the preset lower limit, it is impossible for the mobile station 8 to communicate with the base station 1 under an appropriate condition.

In this case, a return is performed to the step S110 where the measurement of the electrical field strength is repeated. On the other hand, when the measured electric field strength is greater than the preset lower limit, it is determined that a vehicle having this mobile station 8 installed thereon (hereinafter also referred to as an own vehicle) has entered a communicable area of the base station 1, and the processing flow advances to step S112.

In step S112, the radio communication section 11 receives a radio transmission signal sent from the base station 1.

In step S113, the other station allocation determination unit 13 examines the MDS allocation information of the FCMS in the received radio transmission signal. If information indicating that an MDS has been allocated to another mobile station is set in the MDS allocation information, it is determined that another vehicle having a mobile station installed thereon is approaching the own vehicle, and the processing flow advances to step S114.

On the other hand, when information indicating that any MDS has not been allocated to another mobile station is not set in the FCMS, the processing flow advances to step S115.

In step S114, since the vehicle having another mobile station installed thereon is approaching, the warning command unit 15 generates a warning command signal whereby the warning unit in the form of the warning lamp 16 is lit. The warning unit comprises the warning lamp 16 in this embodiment, but may instead comprise another device, such as a buzzer, for providing a warning to the operator or driver of the own vehicle.

In step S115, the other station allocation determination unit 13 determines whether there is an MDS allocation request from the input section 6 or the like, and when there is no such request, the warning procedure is ended, whereas when there is such a request, the processing flow advances to step S116.

In step S116, the MDS allocation request unit 14 creates ACTS data that requests the base station 1 to allocate the MDS of the own station to the ACTS, and sends it to the radio communication section 11.

In step S117, the radio communication section 11 performs dedicated short range communications with the base station 1 so as to send it a radio transmission signal comprising the ACTS data thus created. The base station 1 receives the radio transmission signal through the dedicated short range communications, and performs operations such as those in steps S101 through S106, as shown in FIG. 4.

Specifically, in step S118, the base station 1 receives the radio transmission signal from the mobile station 8.

In step S119, the base station 1 examines the MDS allocation information of the FCMS in the radio transmission signal. When there is an allocation to the own station in the MDS allocation information, the processing flow advances to step S120, whereas when there is no allocation to the own station, a return to step S110 is carried out.

In step S120, the data processing unit 12 creates data to be sent to an MDS allocated to the own mobile station, and sends it to the radio communication section 11.

In step S121, the radio communication section 11 performs dedicated short range communications with the base station 1, and the processing flow returns to step S110.

Such a dedicated short range communications system can suppress the occurrence of human damage upon a rear-end collision. Concretely, it provides not only the operator of the following vehicle with a means for drawing attention to the existence of a preceding vehicle communicating to the base station 1, but also the operator of the preceding vehicle with a means for knowing the approach of the following vehicle so as to be able to take a protective or defensive measure for preparation for rear-end collision at an early stage.

Embodiment 2

Figure 6:
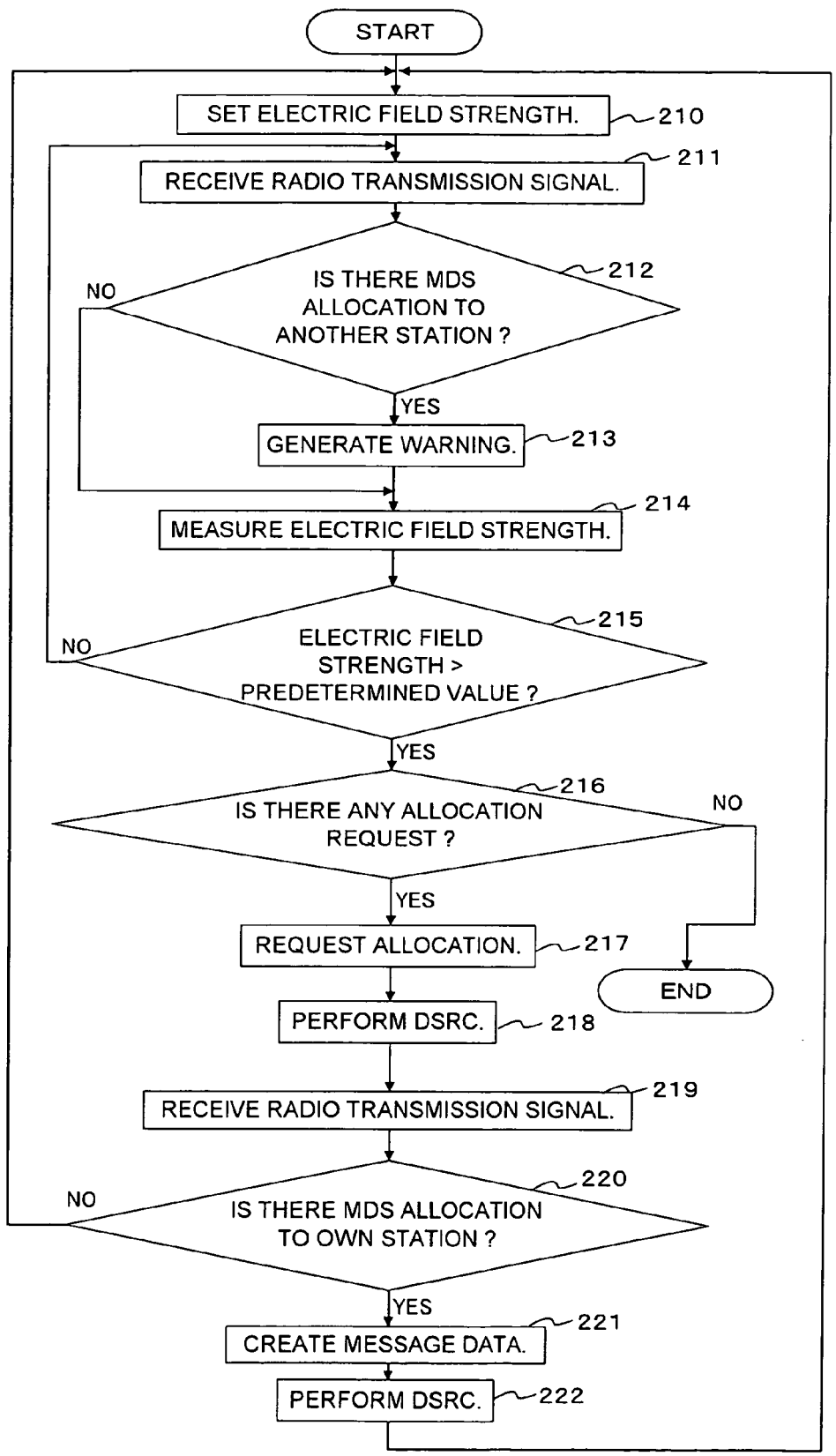
FIG. 6 is a flow chart showing the operation of a mobile station in a dedicated short range communications system according to a second embodiment of the present invention.

FIG. 6 is a flow chart that shows the operation of a mobile station in a dedicated short range communications system according to a second embodiment of the present invention.

A base station, a mobile station and a communication format in the dedicated short range communications system according to this second embodiment are similar to those in the above-mentioned first embodiment, and hence an explanation of the similar portions is omitted. The mobile station of the second embodiment is different from that of the first embodiment in that it can detect the approach of a vehicle having another mobile station installed thereon from the format of a received radio transmission signal irrespective of the strength of electric field thereby to generate a warning.

Next, the operation of the mobile station 8 will be described while referring to FIG. 6.

In step S210, when the mobile station 8 is activated, the radio electric field strength measuring section 10 measures the strength of an electric field therearound.

In step S211, the radio communication section 11 receives a radio transmission signal sent from the base station 1.

In step S212, the other station allocation determination unit 13 examines the MDS allocation information of the FCMS in the received radio transmission signal. If information indicating that an MDS has been allocated to another mobile station is set in the MDS allocation information, it is determined that another vehicle having a mobile station installed thereon is approaching the own vehicle, and the processing flow advances to step S213.

On the other hand, when such MDS allocation information is not set in the FCMS, the processing flow advances to step S214.

In step S213, since the vehicle having another mobile station installed thereon is approaching, the warning command unit 15 generates a warning command signal whereby the warning unit in the form of the warning lamp 16 is lit.

In step S214, the radio electric field strength measuring section 10 measures the strength of an electric field therearound.

In step S215, it is determined whether the strength of electric field thus measured is greater than or equal to a predetermined value.

When the measured electric field strength is smaller than the predetermined value, a return is performed to step S211 where the measurement of the radio transmission signal is repeated, whereas when the measured electric field strength is greater than the predetermined value, it is determined that a vehicle having this mobile station 8 installed thereon has entered a communication area where it can perform dedicated short range communications with the base station 1, and the processing flow advances to step S216.

In step S216, the other station allocation determination unit 13 determines whether there is an MDS allocation request from the input section 6 or the like, and when there is no such request, the warning procedure is ended, whereas when there is such a request, the processing flow advances to step S217.

In step S217, the MDS allocation request unit 14 creates ACTS data that requests the base station 1 to allocate the MDS of the own station to the ACTS, and sends it to the radio communication section 11.

In step S218, the radio communication section 11 performs dedicated short range communications with the base station 1 so as to send it a radio transmission signal comprising the ACTS data thus created. The base station 1 receives the radio transmission signal through the dedicated short range communications, and performs operations such as those in steps S101 through S106, as shown in FIG. 4.

In step S219, the radio communication section 11 receives the radio transmission signal sent from the base station 1.

In step S220, the other station allocation determination unit 13 examines the MDS allocation information of the FCMS in the received radio transmission signal. When there is an allocation to the own station in the MDS allocation information, the processing flow advances to step S221, whereas when there is no allocation to the own station, a return to step S210 is carried out.

In step S221, the data processing unit 12 creates data to be sent to an MDS allocated to the own mobile station, and sends it to the radio communication section 11.

In step S222, the radio communication section 11 performs dedicated short range communications with the base station 1, and the processing flow returns to step S210.

Such a dedicated short range communications system can detect the existence of a vehicle approaching the own vehicle even at a radio electric field strength not enough to perform data transmission through dedicated short range communications, so that a warning can be given to an occupant or operator in the own vehicle.

Embodiment 3

Figure 7:
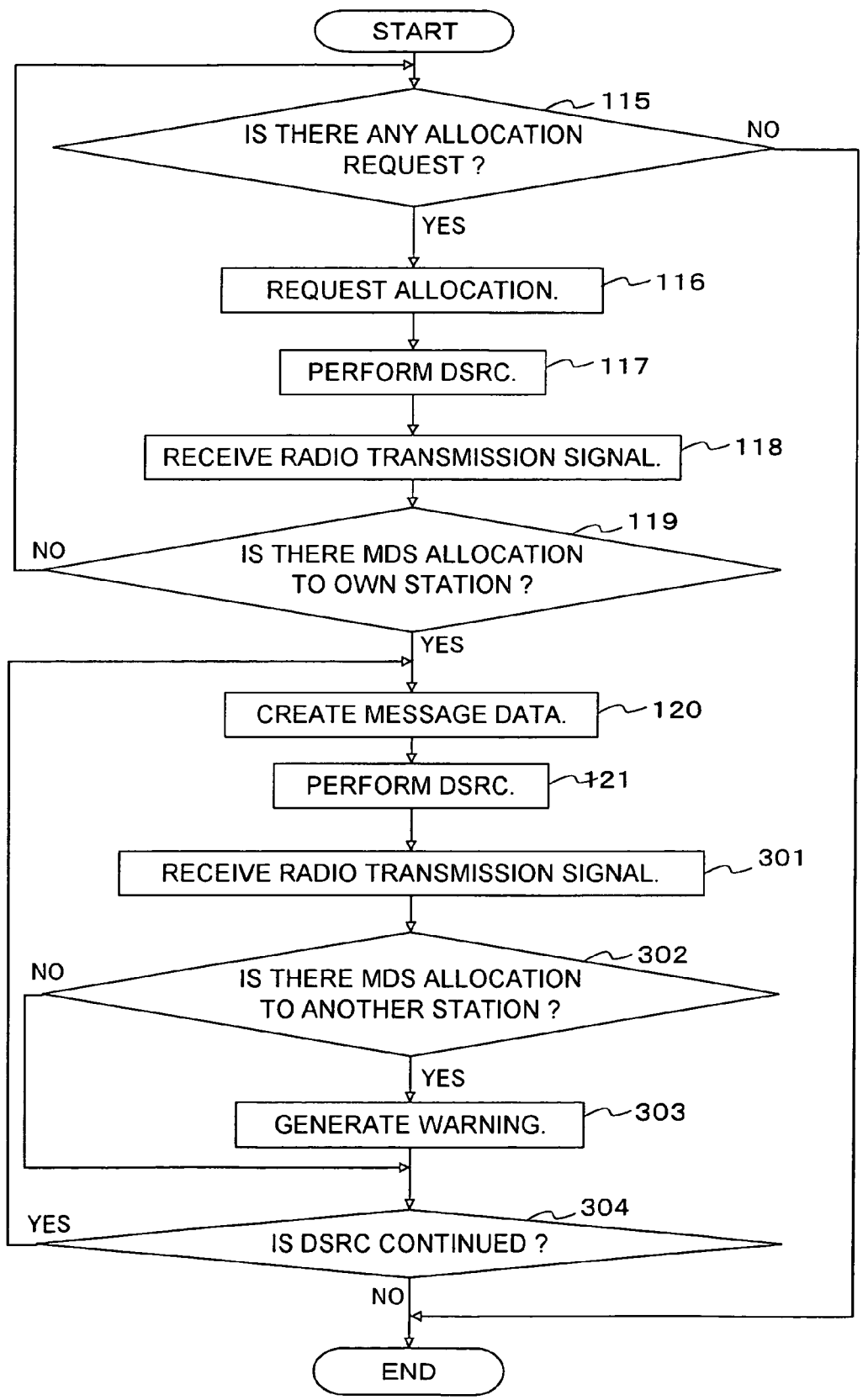
FIG. 7 is a flow chart showing the operation of a mobile station in a dedicated short range communications system according to a third embodiment of the present invention.

FIG. 7 is a flow chart that shows the operation of a mobile station in a dedicated short range communications system according to a third embodiment of the present invention.

A base station, a mobile station and a communication format in the dedicated short range communications system according to this third embodiment are similar to those in the above-mentioned first embodiment, and hence an explanation of the similar portions is omitted. The mobile station of the third embodiment is different from that of the first embodiment in that it can detect the approach of a vehicle having another mobile station installed thereon to provide a warning during performing dedicated short range communications with the base station while being allocated with an MDS from the base station.

Now, the operation of the mobile station 8 will be described while referring to FIG. 7. Steps from S115 to S121 in FIG. 7 are a procedure from the time when the mobile station 8 is allocated with an MDS until the mobile station 8 becomes able to perform dedicated short range communications with the base station 1, and are similar to those in FIG. 5.

Specifically, from steps S115 through S120, the mobile station 8 is allocated with an MDS from the base station 1, and the MDS allocation request unit 14 creates transmission data to be sent to the MDS allocated to the mobile station 8, and send it to the radio communication section 11.

In step S121, the radio communication section 11 performs dedicated short range communications with the base station 1 so as to send it the transmission data thus created. In response to this, the base station 1 receives the radio transmission signal sent from the mobile station 8. The data processing unit 4 of the base station 1 creates a radio transmission signal including necessary information, and sends it to the radio communication section 3. At the same time, the MDS allocation unit 5 detects MDS allocation from another mobile station and updates the MDS allocation information of the FCMS. Thus, thee radio transmission signal freshly sent from the base station 1 to the mobile station 8 includes the updated MDS allocation information.

In step S301, the radio communication section 11 receives the radio transmission signal sent from the base station 1.

In step S302, the other station allocation determination unit 13 examines the MDS allocation information of the FCMS in the received radio transmission signal. If information indicating that an MDS has been allocated to another mobile station is set in the MDS allocation information, it is determined that another vehicle having a mobile station installed thereon is approaching the own vehicle, and the processing flow advances to step S303.

On the other hand, when such MDS allocation information is not set in the FCMS, the processing flow advances to step S304.

In step S303, since the vehicle having another mobile station installed thereon is approaching, the warning command unit 15 generates a warning command signal whereby the warning unit in the form of the warning lamp 16 is lit.

In step S304, it is verified whether the dedicated short range communications is continued. If continued, a return to step S301 is performed, whereas if not continued (i.e., terminated), the dedicated short range communications is ended.

Since such a dedicated short range communications system can detect the approach of a vehicle installing thereon another mobile station while performing dedicated short range communications, an occupant or operator in the own vehicle can also respond to a warning when such a warning is given during the communications.

Embodiment 4

Figure 8:
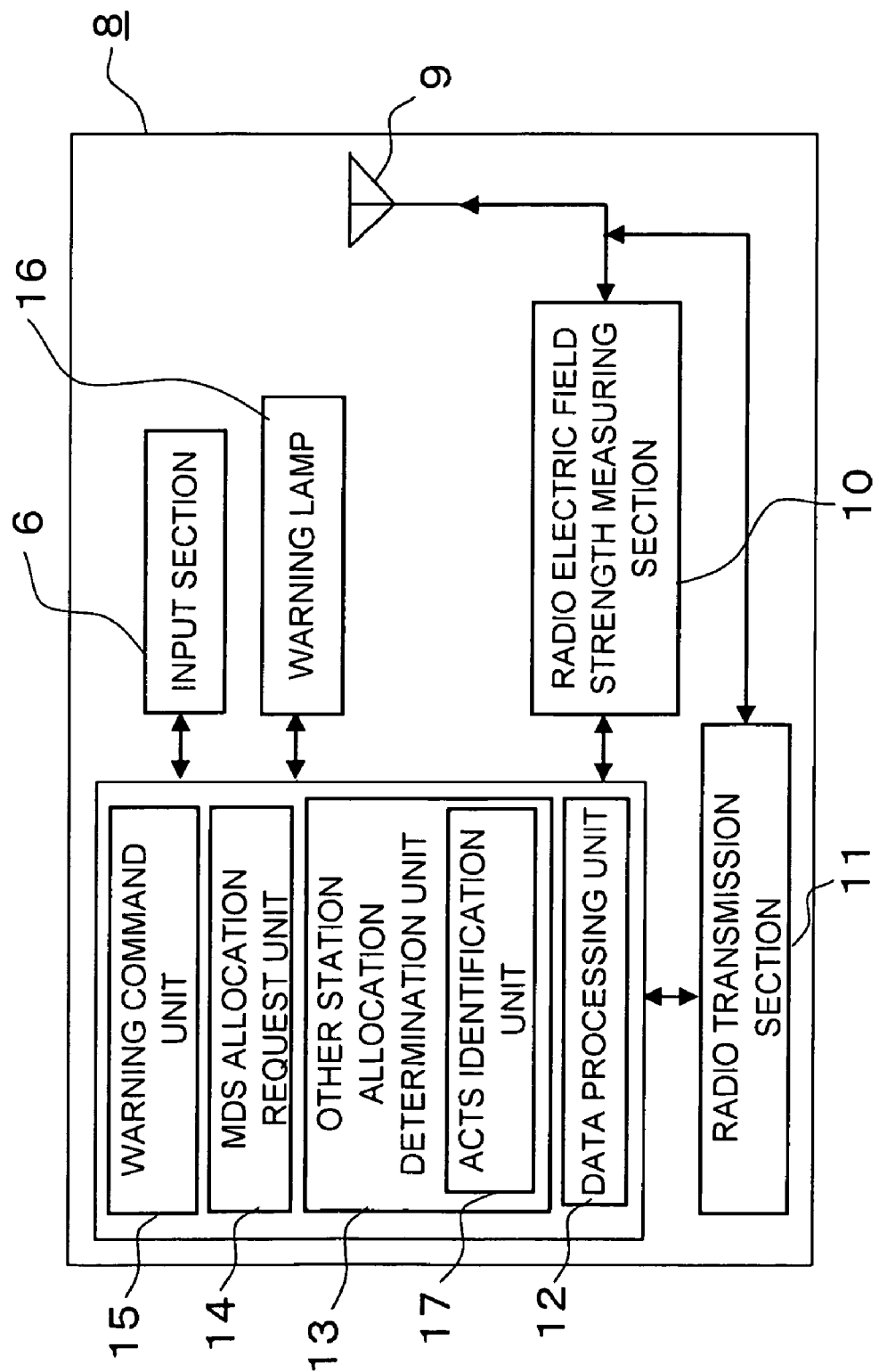
FIG. 8 is a view showing the configuration of a mobile station in a dedicated short range communications system according to a fourth embodiment of the present invention.
Figure 9:
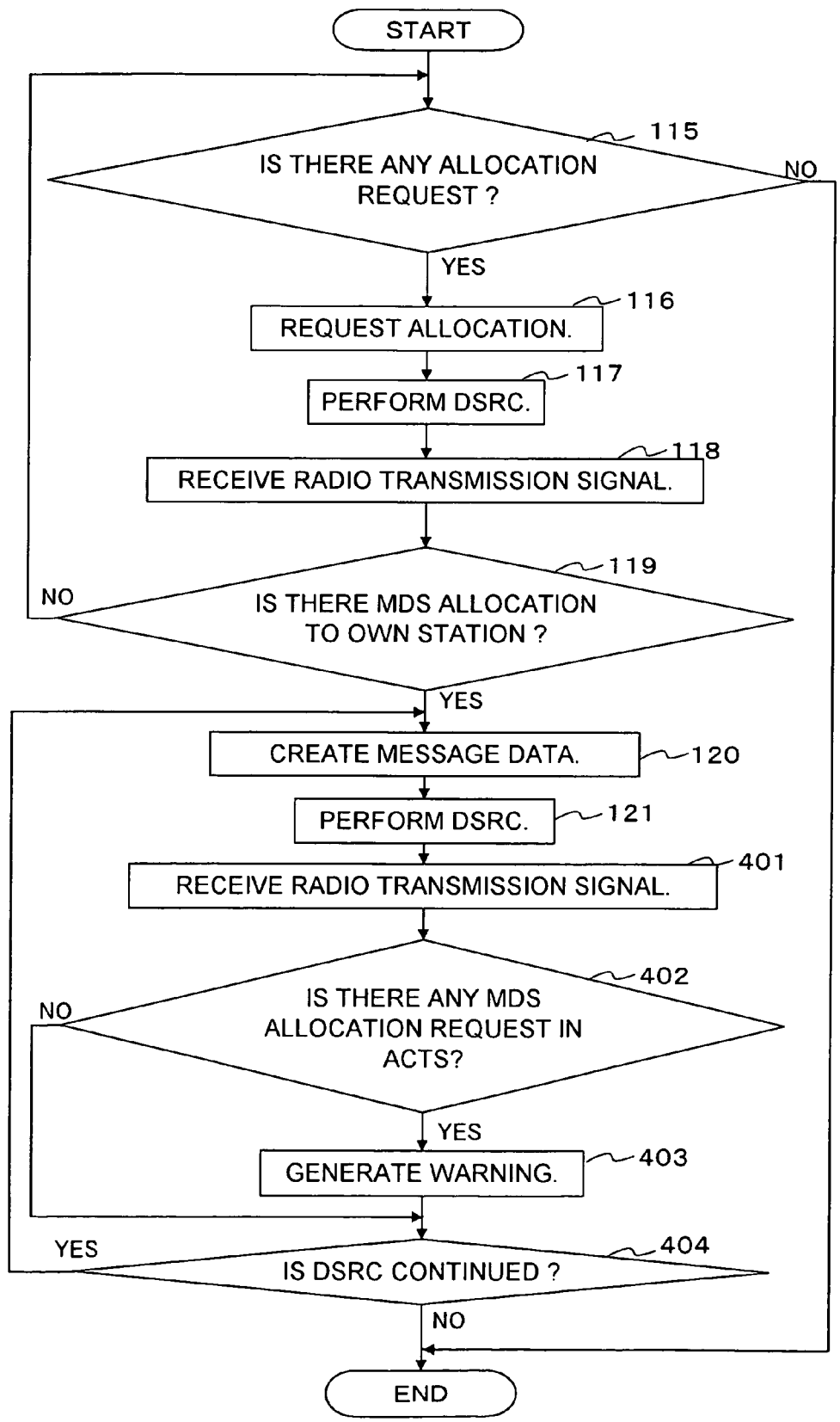
FIG. 9 is a flow chart showing the operation of the mobile station in the dedicated short range communications system according to the fourth embodiment of the present invention.

FIG. 8 shows a block diagram of a mobile station in a dedicated short range communications system according to a fourth embodiment of the present invention. FIG. 9 shows a format for the operation of the mobile station of FIG. 8. The mobile station of this fourth embodiment shown in FIG. 8 is different from that shown in FIG. 2 in that it further includes an activation slot identification unit 17 (hereinafter referred to as an ACTS identification unit) in the other station allocation determination unit 13 of the mobile station 8 of FIG. 2. The remaining configuration of the mobile station 8 of this fourth embodiment is similar to that of FIG. 2, thus omitting an explanation of similar portions. In addition, a base station and a communication format in this embodiment are also similar to those in the first embodiment, and hence an explanation thereof is omitted.

The ACTS identification unit 17 of the mobile unit 8 identifies or verifies whether there is an MDS allocation request from another mobile station in the ACTS of a communication frame, and if such being the case, it sends a signal to the warning command unit 15.

Now, the operation of the mobile station 8 will be described while referring to a flow chart of FIG. 9.

In this flow chart, steps S115 through S121 are similar to those in FIG. 7. That is, the mobile station 8 of a vehicle (hereinafter referred to as an own vehicle) has already been allocated with an MDS by the base station 1, and the data processing unit 12 creates data to be sent to the MDS allocated to the own mobile station 8, and sends it to the radio communication section 11.

The radio communication section 11 performs dedicated short range communications with the base station 1 so as to send it the radio transmission signal thus created. In response, the base station 1 receives the radio transmission signal sent from the mobile station 2. The data processing unit 4 of the base station 1 creates a radio transmission signal including necessary information, and sends it to the radio communication section 3. At the same time, when there is a new MDS allocation request from another mobile station, the MDS allocation unit 5 sets the new allocation request in the ACTS of a radio transmission signal to be sent to the already allocated mobile station 2. That is, the radio transmission signal freshly sent from the base station 1 to the mobile station 2 includes the ACTS thus updated, so that the status of the MDS allocation can be determined by examining the ACTS.

Thereafter, in step S401, the radio communication section 11 of the mobile station 8 installed on the own vehicle receives the radio transmission signal sent from the base station 1.

In step S402, the ACTS identification unit 17 examines the ACTS of the received radio transmission signal. When there is an MDS allocation request from another mobile station in the ACTS, it is determined that another vehicle having that mobile station installed thereon is approaching the own vehicle, and the processing flow advances to step S403.

On the other hand, when there is no such MDS allocation request from another mobile station set in the ACTS, the processing flow advances to step S404.

In step S403, since the vehicle having another mobile station installed thereon is approaching, the warning command unit 15 of the mobile station 2 generates a warning command signal whereby the warning unit in the form of the warning lamp 16 is lit.

In step S404, it is verified whether the dedicated short range communications is continued. If continued, a return to step S120 is performed, whereas if not continued (i.e., terminated), the dedicated short range communications is ended.

Such a dedicated short range communications system can detect the approach of a vehicle installing thereon a mobile station to which an MDS has not been allocated by the base station 1, it is possible to effectively provide a warning even if there are a lot of numbers of vehicles.

Embodiment 5

Figure 10:
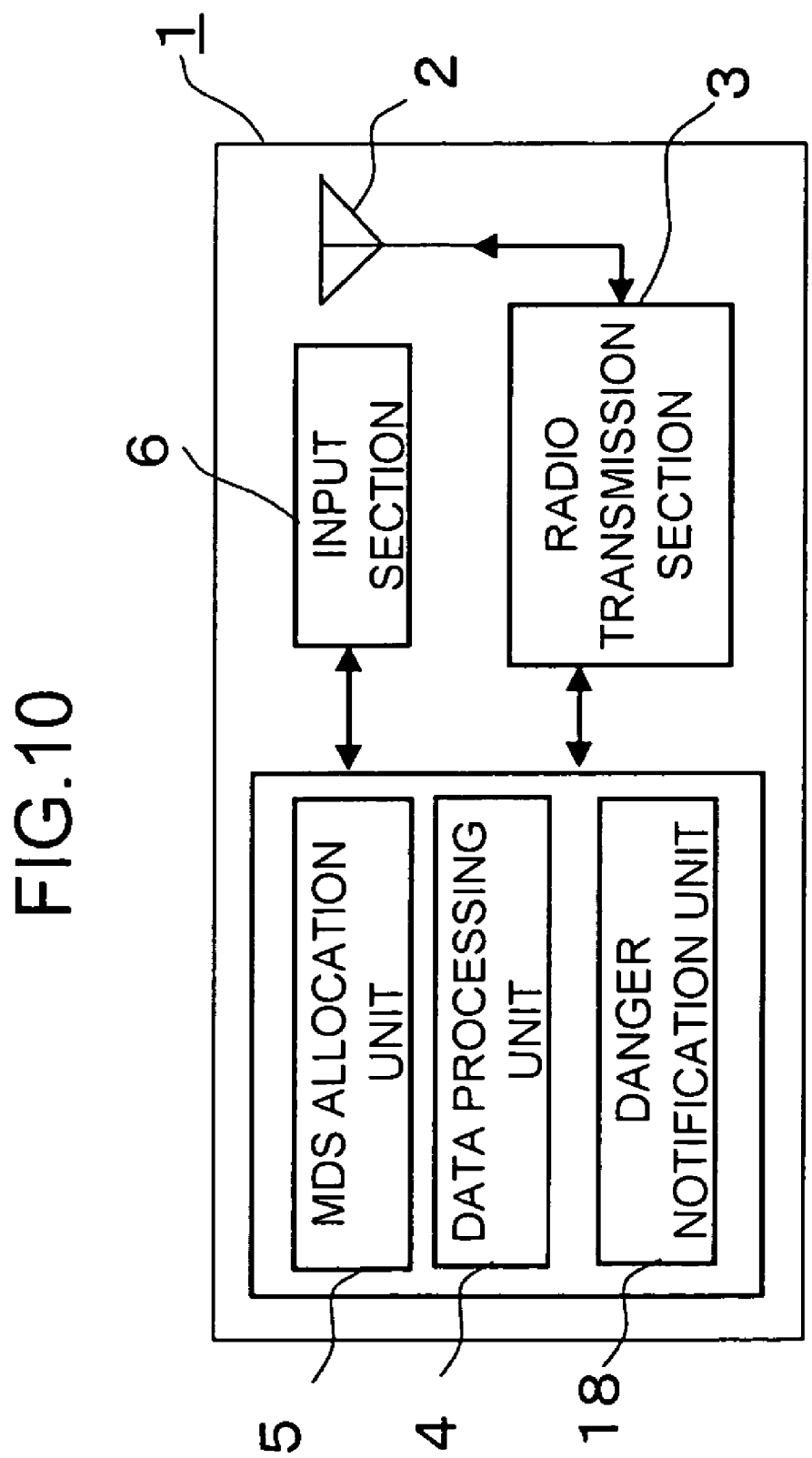
FIG. 10 is a view showing the configuration of a base station in a dedicated short range communications system according to a fifth embodiment of the present invention.
Figure 11:
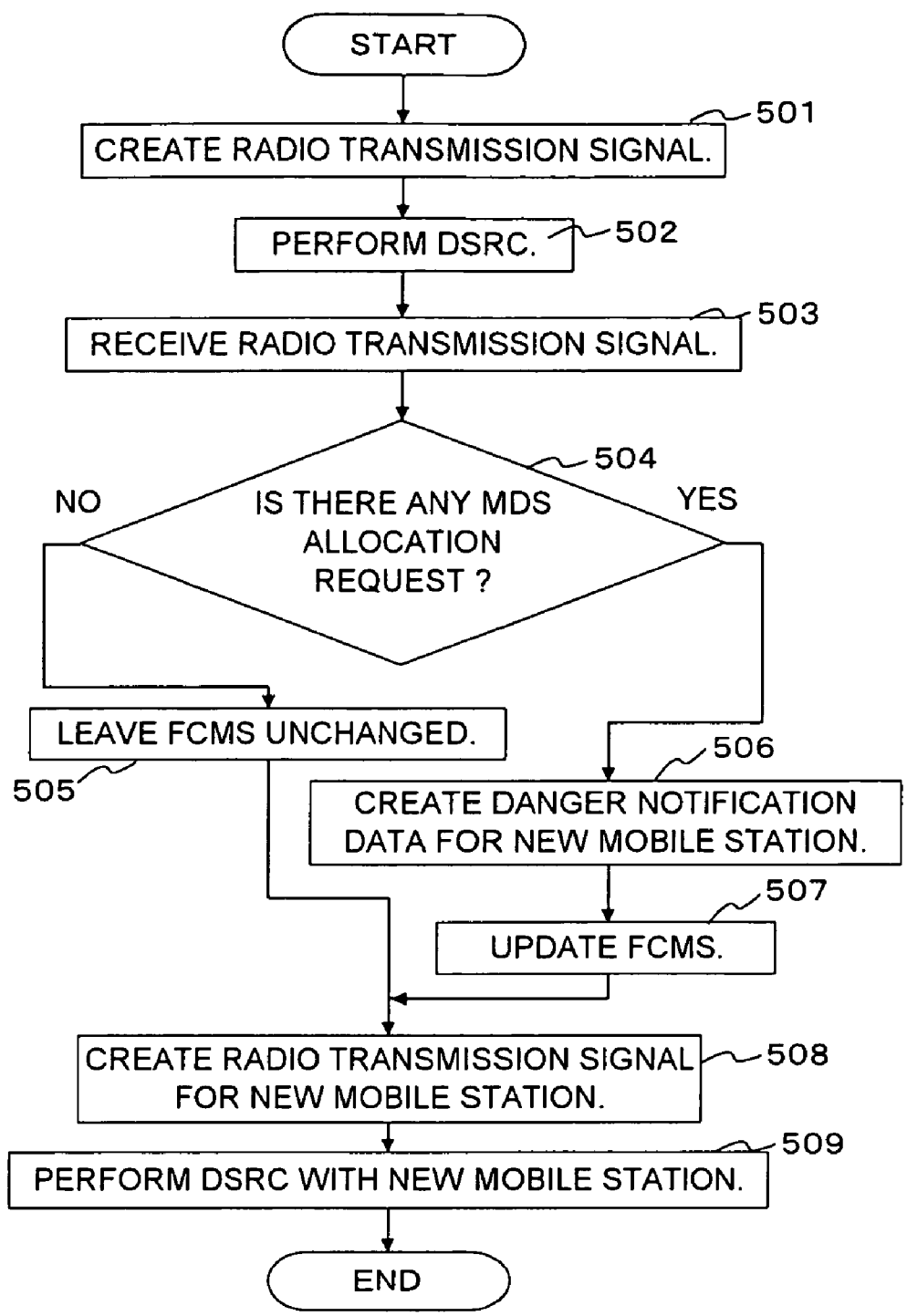
FIG. 11 is a flow chart showing the operation of the base station in the dedicated short range communications system according to the fifth embodiment of the present invention.
Figure 12:
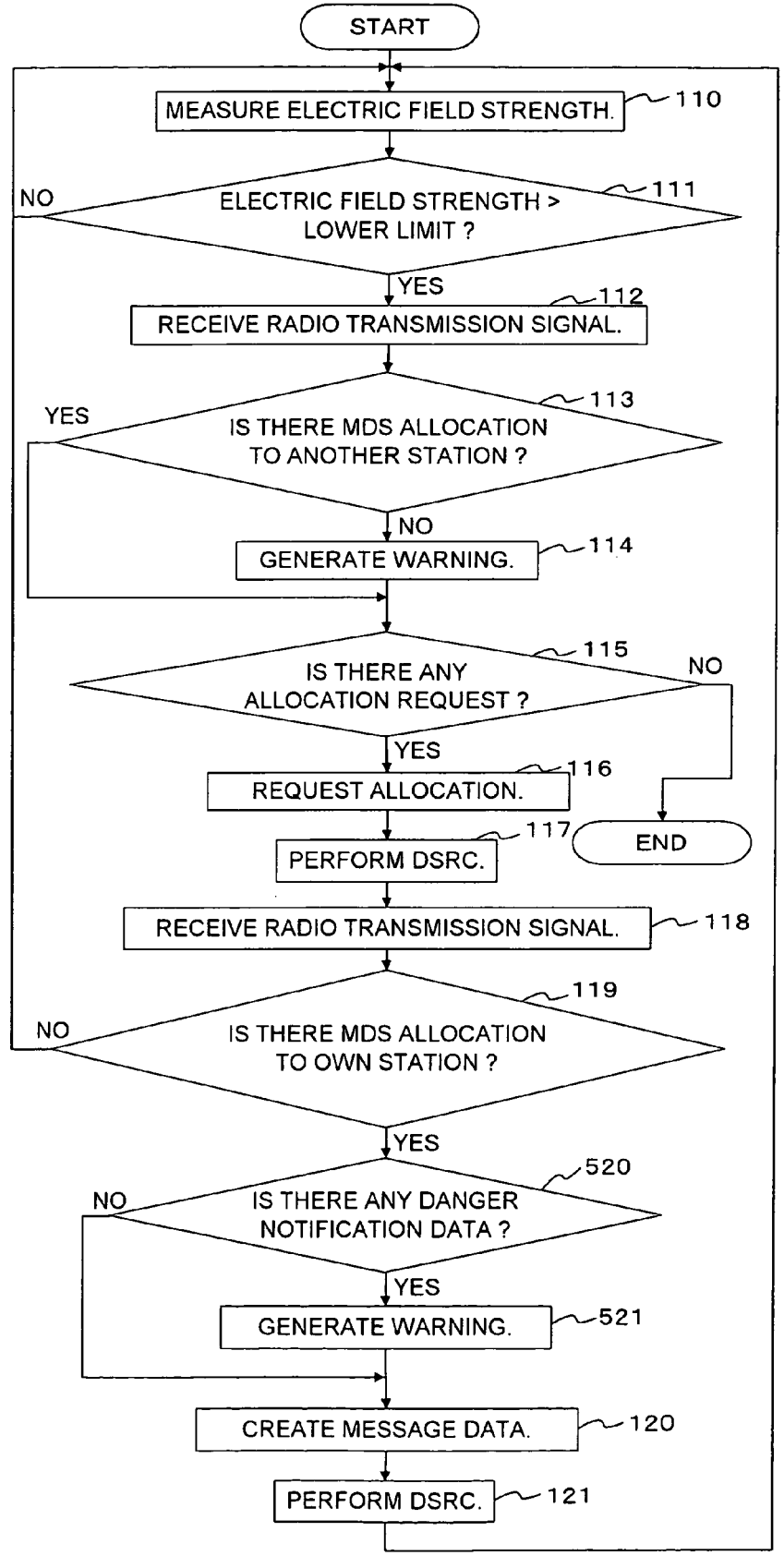
FIG. 12 is a flow chart showing the operation of a mobile station in the dedicated short range communications system according to the fifth embodiment of the present invention.

FIG. 10 is a view that shows the configuration of a base station in a dedicated short range communications system according to a fifth embodiment of the present invention. FIGS. 11 and 12 are flow charts that show the warning operation of the dedicated short range communications system according to the fifth embodiment of the present invention. A base station of FIG. 10 is different from that of FIG. 1 in that it further includes a danger notification unit, but is similar thereto in other respects.

Also, a mobile station and a communication format in the dedicated short range communications system according to this fifth embodiment are similar to those in the above-mentioned first embodiment, and hence an explanation thereof is omitted.

The danger notification unit 18 shown in FIG. 10 creates danger notification data for notifying the existence of another mobile station in the communicable area of the base station, and sends it to a specific mobile station of a vehicle (hereinafter also referred to as an own vehicle). The danger notification unit 18 is constituted by a microcomputer, as in the case of the data processing unit 4 and the MDS allocation unit 5.

Now, the operation of this base station 1 will be described while referring to a flow chart of FIG. 11.

In step S501, the data processing unit 4 of the base station 1 creates a radio transmission signal for the specific mobile station to which an MDS has been allocated, and sends it to the radio communication section 3.

In step S502, the radio communication section 3 performs dedicated short range communications with the specific mobile station.

In step S503, the radio communication section 3 receives a radio transmission signal sent from the specific movable station.

In step S504, the MDS allocation unit 5 determines the presence or absence of an MDS allocation request from a new mobile station in the ACTS of the received radio transmission signal. When there is no MDS allocation request from a new mobile station, the processing flow advances to step S505, whereas when there is an MDS allocation request from a new mobile station, the processing flow advances to step S506.

In step S505, since the data processing unit 4 leaves the FCMS unchanged or as it is because of the absence of MDS allocation.

In step S506, the MDS allocation unit 5 allocates an MDS to the new mobile station which made the allocation request, and the data processing unit 4 creates danger notification data as transmission data for the new mobile station.

In step S507, the data processing unit 4 updates the FCMS.

In step S508, the danger notification unit 18 creates a radio transmission signal including the updated FCMS and the dangerous notification data for the new mobile station, and sends it to the radio communication section 3.

In step S509, the radio communication section 3 performs dedicated short range communications with the mobile station to which an MDS has been freshly allocated.

Next, the operation of the mobile station requesting a new allocation will be described while referring to a flow chart of FIG. 12.

Figure 5:
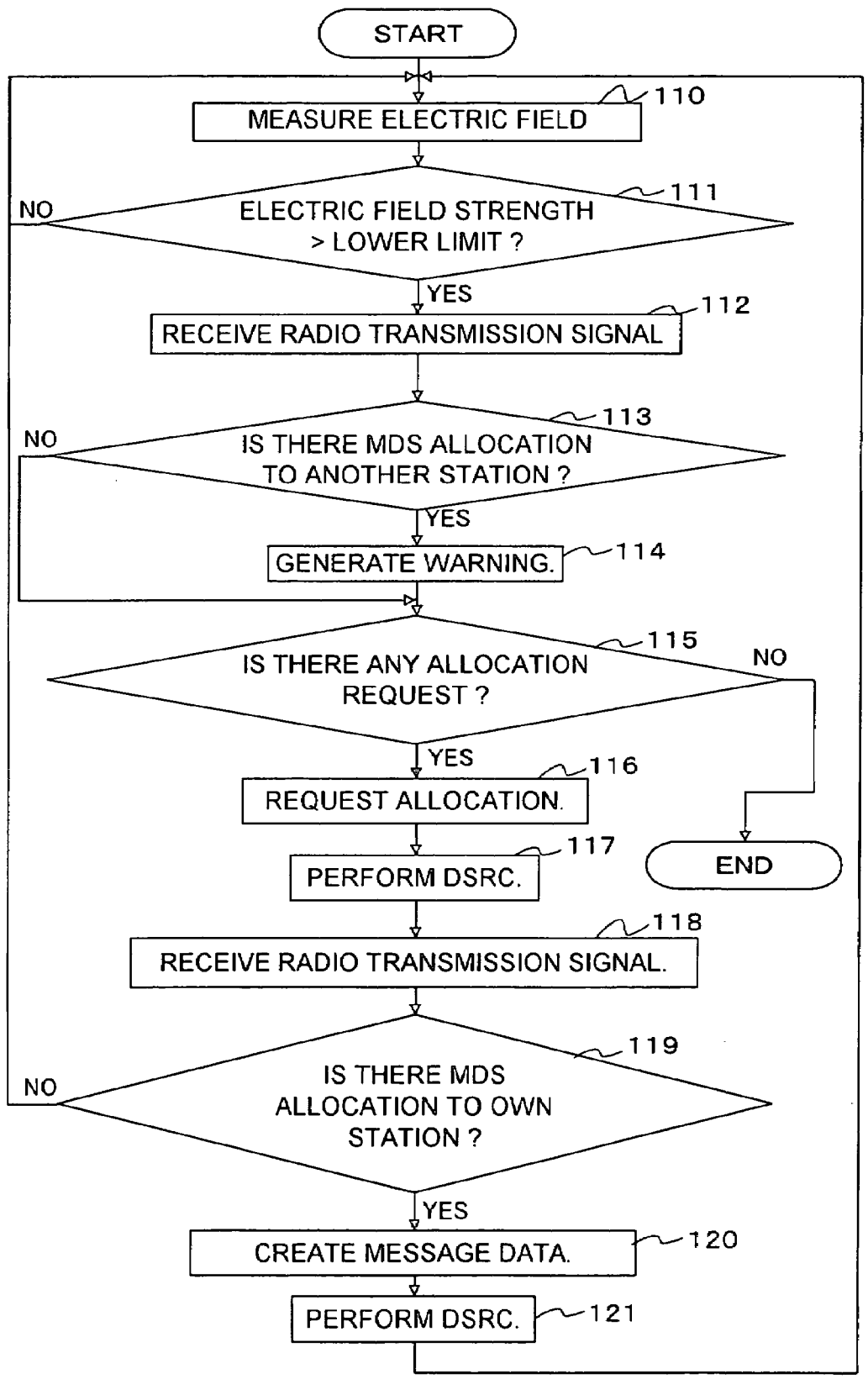
FIG. 5 is a flow chart showing the operation of the mobile station of the dedicated short range communications system according to the first embodiment of the present invention.

Steps from S110 to S119 in FIG. 12 are similar to those in FIG. 5, and hence are identified at the same symbols while omitting an explanation thereof. When an MDS has been allocated to the specific or own mobile station in step S119, the data processing unit 12 of the specific or own mobile station determines the presence or absence of the danger notification data included in the MDS in step S520. When the danger notification data is not included, the processing flow advances to step S120, whereas when the danger notification data is included, the processing flow advances to step S521.

In step S521, since a vehicle having another mobile station installed thereon is approaching, the warning command unit 15 generates a warning command signal whereby the warning unit in the form of the warning lamp 16 is lit.

In such a dedicated short range communications system, an occupant or operator in a vehicle installing thereon another mobile station freshly approaching around the base station can obtain information on other approaching vehicles collectively together with the allocation of MDSes, and hence can make a prompt or speedy response.

Embodiment 6

Figure 13:
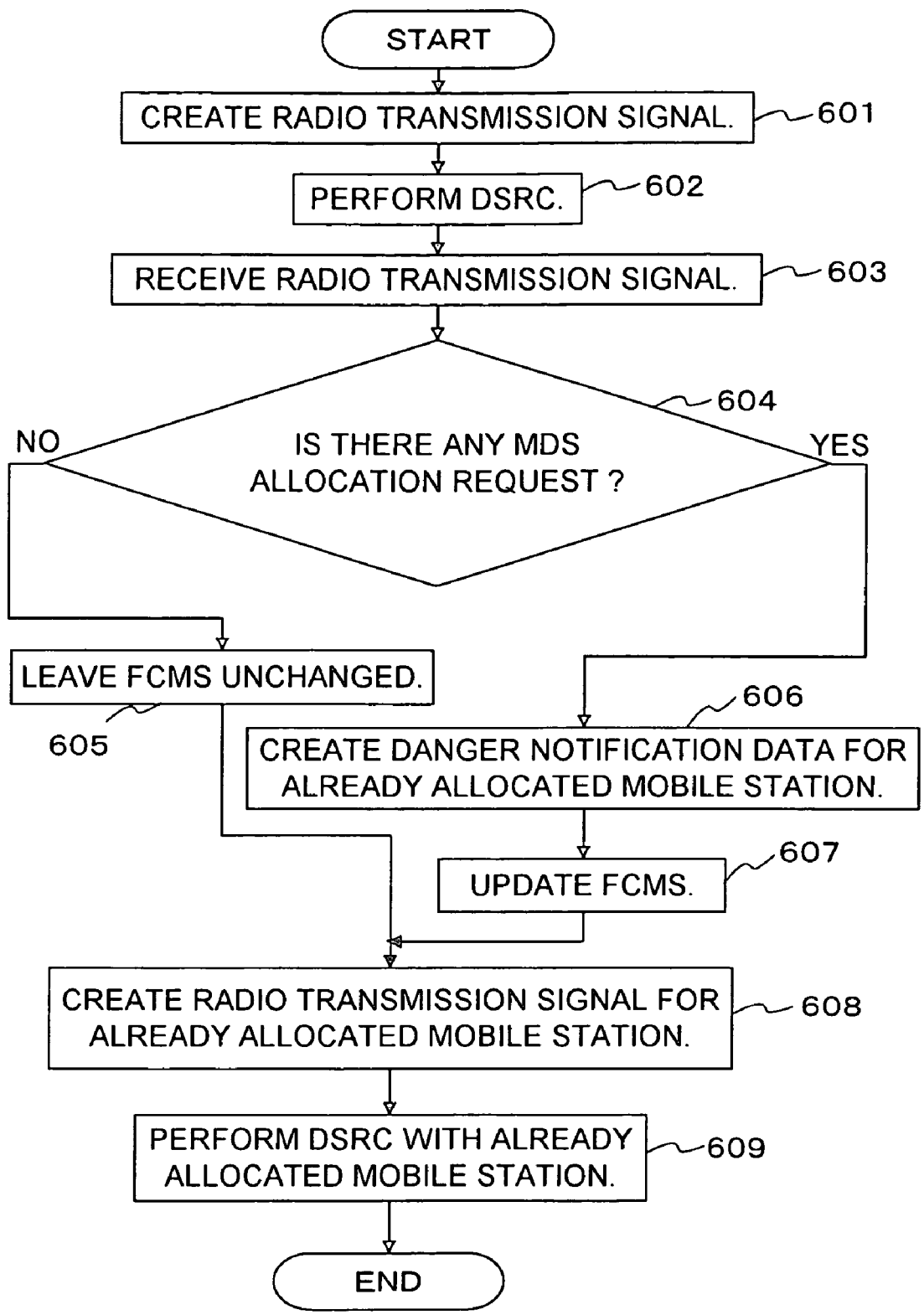
FIG. 13 is a flow chart showing the operation of a base station in a dedicated short range communications system according to a sixth embodiment of the present invention.
Figure 14:
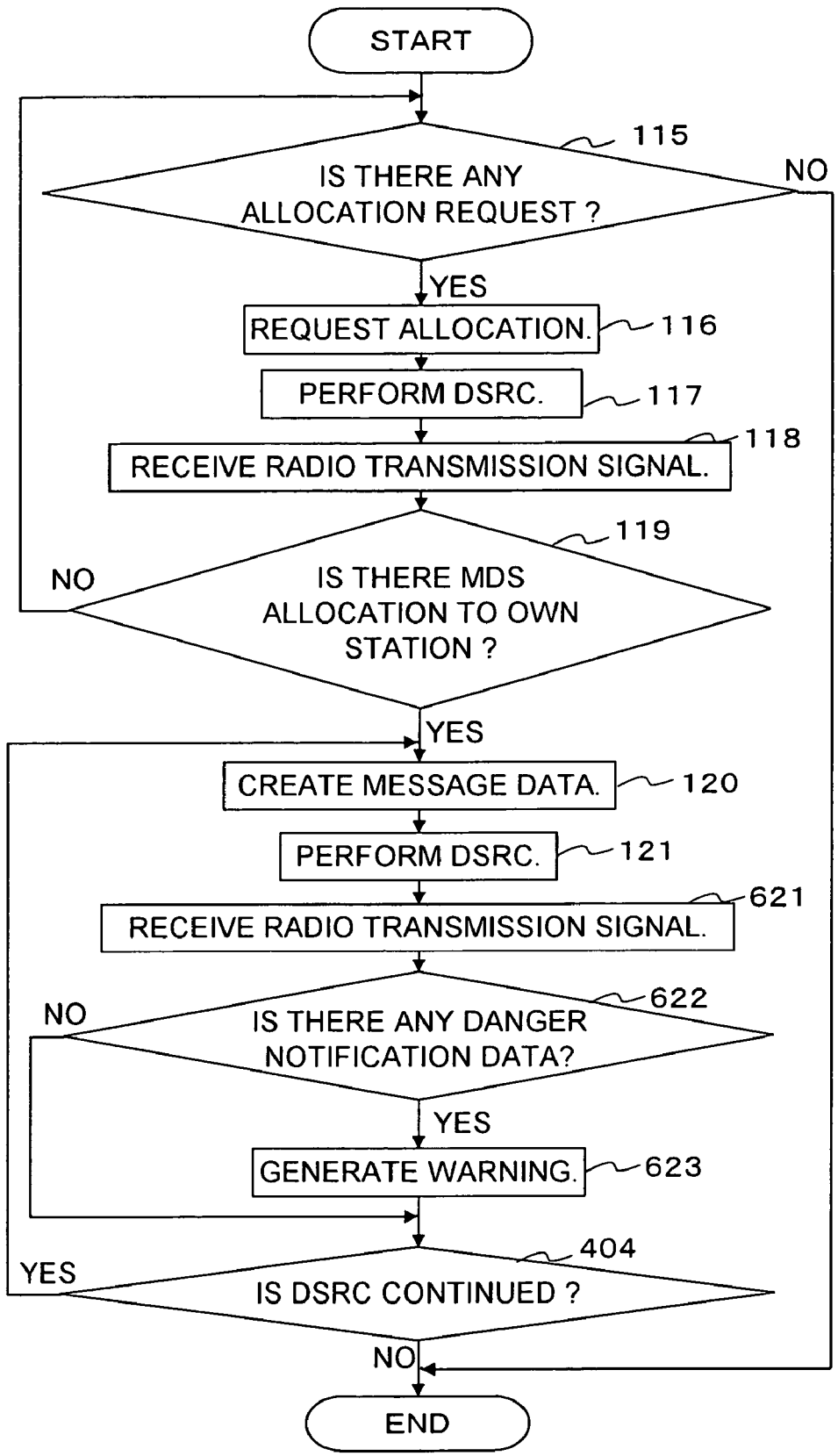
FIG. 14 is a flow chart showing the operation of a mobile station in the dedicated short range communications system according to the sixth embodiment of the present invention.

FIG. 13 and FIG. 14 are flow charts that show the warning operation of a dedicated short range communications system according to a sixth embodiment of the present invention. A base station, a mobile station and a communication format in the dedicated short range communications system according to this sixth embodiment are similar to those in the above-mentioned fifth embodiment, and hence an explanation thereof is omitted.

Now, the operation of this base station 1 will be described while referring to a flow chart of FIG. 13. Steps from S601 to S605 in FIG. 13 are similar to those in FIG. 11, and hence an explanation thereof is omitted.

In step S606, the MDS allocation unit 5 allocates an MDS to a new mobile station which made an allocation request, and the danger notification unit 18 creates danger notification data as transmission data for an already allocated mobile station.

In step S607, the data processing unit 4 updates the FCMS in the received radio transmission signal.

In step S608, the danger notification unit 18 creates a radio transmission signal including the updated FCMS and the dangerous notification data for the already allocated mobile station, and sends it to the radio communication section 3.

In step S609, the radio communication section 3 performs dedicated short range communications with the already allocated mobile station.

Next, the operation of the mobile station will be described while referring to FIG. 14. Steps from S115 to S121 in FIG. 14 are similar to those in FIG. 7, and hence an explanation thereof is omitted.

The radio communication section 11 of the mobile station 8 to which an MDS has already been allocated receives the radio transmission signal sent from the base station 1 in S621.

In step S622, the data processing unit 12 of the mobile station 8 to which an MDS has already been allocated converts the radio transmission signal thus received into corresponding reception data, and makes a determination as to whether there is included danger notification data in the MDS. When danger information indicating the approach of another mobile station is included, the warning command unit 15 generates a warning signal, and the processing flow advances to step S623, whereas when no danger notification data is included, the processing flow advances to step S404.

In step S623, warning lamp 16 in the form of the warning unit provides a warning of to the occupant or operator if the caution signal is input, and the processing flow advances to S404.

In step S404, it is verified whether the dedicated short range communications is continued. If continued, a return to step S120 is performed, whereas if not continued (i.e., terminated), the dedicated short range communications is ended.

Such a dedicated short range communications system can detect the existence of an approaching vehicle by determining or examining only message data. As a result, it is possible for the occupant or operator in the own vehicle to obtain information to be warned or cautioned only by exchanging data between the mobile station 8 and the base station 1.

If the present invention is used, as practical examples, for electronic toll collection systems in expressways, parking lots and the like, it is possible to avoid collision between vehicles, etc.

While the invention has been described in terms of preferred embodiments, those skilled in the art will recognize that the invention can be practiced with modifications within the spirit and scope of the appended claims.

What is claimed is:

1. A mobile station of a dedicated short range communications system capable of performing dedicated short range communications between a base station and at least one mobile station by using a radio transmission signal of a communication frame configuration having message data slots to be allocated to mobile stations, respectively, a frame control information slot including allocation information of mobile stations allocated to said message data slots, respectively, and an activation slot for a mobile station to request said base station to allocate one of said message data slots to said mobile station, each of said mobile stations comprising:

a data processing unit that performs data processing of radio transmission signals received by and to be sent from said mobile station;

an other station allocation determination unit that determines, based on a frame control information slot of said received radio transmission signal, whether a message data slot of said received radio transmission signal is allocated to another mobile station;

a message data slot allocation request unit that requests, in an activation slot of said radio transmission signal to be sent, said base station to allocate a message data slot to said mobile station; and a warning command unit that generates a warning command when a message data slot of said received radio transmission signal is allocated to another mobile station.

2. The mobile station of a dedicated short-range communications system as set forth in claim 1, further comprising a radio electric field strength measuring section that measures the strength of an electric field when a radio transmission signal sent from said base station is received by its own mobile station, wherein said data processing unit performs data processing of said radio transmission signal thus received when said electric field strength is greater than or equal to a predetermined value, and said other station allocation determination unit determines, irrespective of said electric field strength, whether a message data slot of said received radio transmission signal is allocated to another mobile station.

3. The mobile station of a dedicated short range communications system as set forth in claim 1, wherein during the time when said data processing unit is performing dedicated short range communications with said base station, said other station allocation determination unit determines whether a message data slot of said radio transmission signal received by its own mobile station is allocated to another mobile station.

4. The mobile station of a dedicated short range communications system as set forth in claim 1, wherein during the time when said data processing unit is performing dedicated short range communications with said base station, said other station allocation determination unit determines whether there is a message data slot allocation request from another mobile station in the activation slot of said radio transmission signal received by its own mobile station, and said warning command unit generates a warning command when there is a message data slot allocation request from another mobile station.

5. A mobile station of a dedicated short range communications system capable of performing dedicated short range communications between a base station and at least one mobile station by using a radio transmission signal of a communication frame configuration having message data slots to be allocated to mobile stations, respectively, a frame control information slot including allocation information of mobile stations allocated to said message data slots, respectively, and an activation slot for a mobile station to request said base station to allocate one of said message data slots to its own station, each of said mobile stations comprising:
- a data processing unit that performs data processing of radio transmission signals received by and to be sent from its own mobile station;
- a message data slot allocation unit that allocates a new message data slot to a new mobile station when there is a message data slot allocation request from said new mobile station; and
- a danger notification unit that creates danger notification data for notifying the existence of another mobile station in a communicable area of said base station, and sends said danger notification data to said new mobile station to which the new message data slot has been allocated.

6. A mobile station of a dedicated short range communications system capable of performing dedicated short range communications between a base station and at least one mobile station by using a radio transmission signal of a communication frame configuration having message data slots to be allocated to mobile stations, respectively, a frame control information slot including allocation information of mobile stations allocated to said message data slots, respectively, and an activation slot for a mobile station to request said base station to allocate one of said message data slots to its own station, each of said mobile stations comprising;
- a data processing unit that performs data processing of radio transmission signals received by and to be sent from its own mobile station;
- a message data slot allocation unit that allocates a new message data slot to a new mobile station when there is a message data slot allocation request from said new mobile station; and
- a danger notification data that creates danger notification data for notifying the entry of another mobile station, to which the new message data slot has already been allocated, into a communicable area of said base station, and sends said danger notification data to mobile stations which exist in said communicable area of said base station.

7. A dedicated short range communications system having a plurality of mobile stations, wherein dedicated short range communications between a base station and at least one mobile station is performed by using a radio transmission signal of a communication frame configuration having message data slots to be allocated to mobile stations, respectively, a frame control information slot including allocation information of mobile stations allocated to said message data slots, respectively, and an activation slot for a mobile station to request said base station to allocate one of said message data slots to said mobile station, each of said plurality of mobile stations comprising:
- a data processing unit that performs data processing of radio transmission signals received by and to be sent from said mobile station;
- an other station allocation determination unit that determines, based on a frame control information slot of said received radio transmission signal, whether a message data slot of said received radio transmission signal is allocated to another mobile station;
- a message data slot allocation request unit that requests, in an activation slot of said radio transmission signal to be sent, said base station to allocate a message data slot to said mobile station; and
- a warning command unit that generates a warning command when a message data slot of said received radio transmission signal is allocated to another mobile station.

* * * * *